Figure 1:
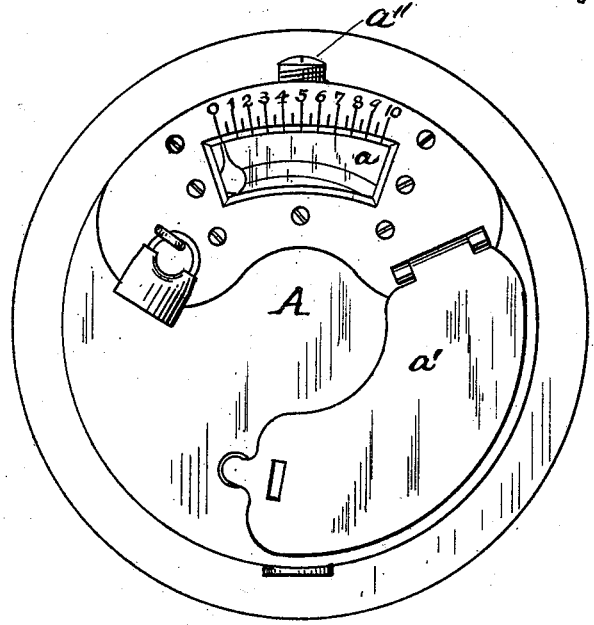

(No Model.) 2 Sheets—Sheet 1.
A. C. MEADY.
PRESSURE GAGE FOR USE ON HEAVY ORDNANCE.
No. 523,404. Patented July 24, 1894.

WITNESSES. INVENTOR.

(No Model.) 2 Sheets—Sheet 2.

A. C. MEADY.
PRESSURE GAGE FOR USE ON HEAVY ORDNANCE.

No. 523,404. Patented July 24, 1894.

WITNESSES. INVENTOR.
Marion C. Pomeroy Albert Cecil Meady
H. B. Wilson per W. H. Singleton,
Atty.

UNITED STATES PATENT OFFICE.

ALBERT CECIL MEADY, OF SOMERVILLE, ASSIGNOR TO THE CROSBY STEAM GAGE AND VALVE COMPANY, OF BOSTON, MASSACHUSETTS.

PRESSURE-GAGE FOR USE ON HEAVY ORDNANCE.

SPECIFICATION forming part of Letters Patent No. 523,404, dated July 24, 1894.

Application filed September 7, 1891. Serial No. 404,963. (No model.)

*To all whom it may concern:*

Be it known that I, ALBERT CECIL MEADY, a citizen of the United States, residing at Somerville, in the county of Middlesex and State of Massachusetts, have invented certain new and useful Improvements in Pressure-Gages for Use upon Heavy Ordnance or Guns; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improvement in pressure gages for use upon heavy ordnance or guns.

It appears that in modern gunnery a system of pneumatics is used to prevent the rebounding of the gun when it is discharged. This system is such that the gun is prevented from moving backward by impinging or coming in contact with a chamber filled with compressed air of a very high pressure, oftentimes being that of five hundred to one thousand pounds per square inch. This compressed air chamber acts as a cushion to receive the shock or blow of the discharging gun. The pressure within it remains constant, and it is necessary that the gunner, before firing the piece, shall know that the pressure required to meet the rebounding of the gun is present within the chamber at the time of its discharge. It is therefore necessary that there shall be upon this chamber an instrument which shall measure the pressure within it. Ordinary gages, of capacity to indicate high pressure, have been from time to time employed, but have been unsuccessful on account of the shock or jar which they received from the rebounding or reacting parts of the gun when fired. In some cases the gages were absolutely destroyed as to their internal structure and became worthless. To meet this, the gage to be described was invented. It is found that if the moving parts and mechanism of the pressure gage could be submerged in a fluid, like glycerine or oil or other liquid, they having been designed so they would act within this liquid, like the piston of a dash-pot, when a shock was delivered to the gage these parts would remain constant, being retarded or prevented from vibrating by means of the fluids surrounding them.

The invention consists in the construction hereinafter pointed out.

In using such a device there is no difficulty in operating the gage to indicate the pressure to which the tube was subjected, as the index would slowly, steadily and accurately move in accordance with the power operating it, but when a shock came the index remained steady as also the Bourdon tube did—due to the plate upon the latter and the wide, fin-like part attached to the index not easily moving through the liquid within which they were immersed.

Figure 2:
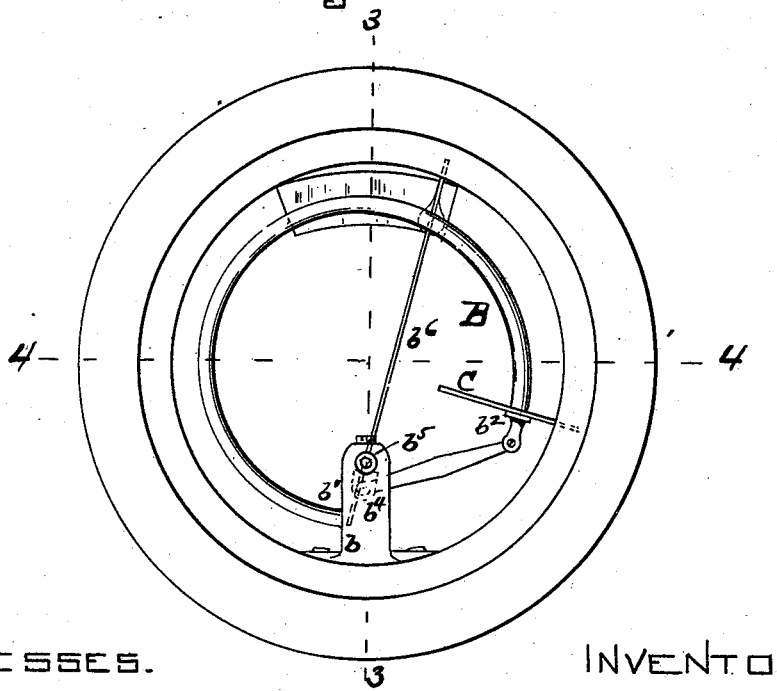
Figure 3:
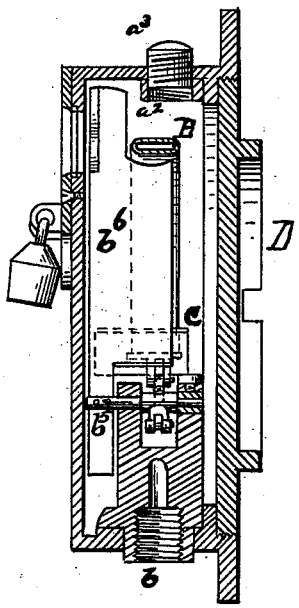
Figure 4:
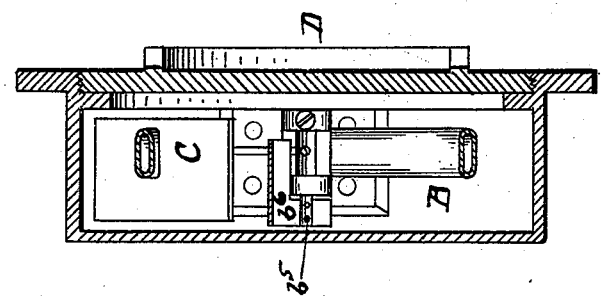

Figure 1 represents a front view, with the cover of the gage dropped down, showing the glass face, and the figures upon the case indicating the pressure to which it may be subjected, and the end of the index below the glass face. Fig. 2 is a view of the back part of the gage, with the metal case removed, showing its interior with the Bourdon tube and the index operated by it, to which it is attached in their relative positions. Fig. 3 represents a vertical section of Fig. 2, at 3—3. Fig. 4 shows a horizontal section of Fig. 2 at 4—4.

In the annexed drawings: the letter A indicates the gage having the back D which can be suitably attached to the air chamber the capacity of which is to be gaged. This gage has a glass dial $a$ with the cover $a'$, and is provided with a filling orifice $a^2$ having a plug $a^3$. On the inside of the gage is the socket $b$ connected with the accumulator, and to this socket $b$ is secured one end $b'$ of the Bourdon tube B. The free end $b^2$ of this tube is connected by a link to the lever $b^4$ attached to the staff $b^5$ upon which is fastened the index $b^6$. This index $b^6$ is made of considerable width so as to nearly fill the space between the front and back of the gage. There is also attached to the Bourdon tube B near its free end $b^2$ a plate C of almost the same width as the index. Through the filling orifice $a^2$, glycerine, oil, or other liquid is put into the gage and the moving parts are immersed therein.

In case the gage is subjected to a sudden shock, due to the full release of the pressure from it, like the breaking of the accumulator, or the taking off the pressure from the accumulator by the breaking of pipes leading from it, or any other cause, instead of the index and the connected parts flying back to zero and becoming shattered, as in most cases they are, in this gage they will return slowly and steadily to their normal position, in which the index indicates zero, or atmospheric pressure within the tube, or, when the accumulator to which the gage is attached receives a severe and sudden shock as it does when attached to heavy ordnance upon being discharged, the several described moving parts are held steadily and undisturbed in their respective places, thereby giving the gunner the true pressure still within the accumulator.

Having described my invention, what I claim is—

A gage provided with a Bourdon tube having an index and a plate secured thereto, the tube, index and plate being submerged in a liquid and the index and plate having a width substantially that of their inclosing chamber.

In testimony whereof I affix my signature in presence of two witnesses.

ALBERT CECIL MEADY.

Witnesses:
JOHN H. MILLETT,
RALPH W. FOSTER.